(12) United States Patent
Jiang et al.

(10) Patent No.: US 9,006,127 B2
(45) Date of Patent: Apr. 14, 2015

(54) SUPPORT FOR SILVER CATALYST IN ETHYLENE OXIDE PRODUCTION, METHODS FOR PREPARING THE SAME, SILVER CATALYST PREPARED THEREFROM, AND USE THEREOF

(75) Inventors: Jun Jiang, Beijing (CN); Jianshe Chen, Beijing (CN); Jinbing Li, Beijing (CN); Shuyun Li, Beijing (CN); Zhixiang Zhang, Beijing (CN); Wei Lin, Beijing (CN); Qian Xue, Beijing (CN)

(73) Assignees: China Petroleum & Chemical Corporation, Beijing (CN); Beijing Research Institute of Chemical Industry, China Petroleum & Chemical Corporation, Beijing (CN)

( * ) Notice: Subject to any disclaimer, the term of this patent is extended or adjusted under 35 U.S.C. 154(b) by 413 days.

(21) Appl. No.: 13/231,901

(22) Filed: Sep. 13, 2011

(65) Prior Publication Data
US 2012/0065055 A1 Mar. 15, 2012

(30) Foreign Application Priority Data
Sep. 13, 2010 (CN) .......................... 2010 1 0281321

(51) Int. Cl.
| | | |
|---|---|---|
| *B01J 27/138* | (2006.01) | |
| *B01J 37/26* | (2006.01) | |
| *B01J 23/50* | (2006.01) | |
| *B01J 37/08* | (2006.01) | |
| *B01J 21/04* | (2006.01) | |
| *B01J 23/58* | (2006.01) | |
| *B01J 35/10* | (2006.01) | |
| *B01J 37/00* | (2006.01) | |
| *B01J 37/02* | (2006.01) | |
| *B01J 27/12* | (2006.01) | |
| *B01J 27/13* | (2006.01) | |
| *B01J 35/00* | (2006.01) | |
| *B01J 35/02* | (2006.01) | |
| *B01J 35/04* | (2006.01) | |

(52) U.S. Cl.
CPC ........ *B01J 23/50* (2013.01); *B01J 37/08* (2013.01); *B01J 21/04* (2013.01); *B01J 23/58* (2013.01); *B01J 27/12* (2013.01); *B01J 27/13* (2013.01); *B01J 27/138* (2013.01); *B01J 35/002* (2013.01); *B01J 35/023* (2013.01); *B01J 35/026* (2013.01); *B01J 35/04* (2013.01); *B01J 35/1009* (2013.01); *B01J 35/1038* (2013.01); *B01J 35/1042* (2013.01); *B01J 37/0009* (2013.01); *B01J 37/0201* (2013.01); *B01J 37/0213* (2013.01)

(58) Field of Classification Search
None
See application file for complete search history.

(56) References Cited

U.S. PATENT DOCUMENTS

| | | | | |
|---|---|---|---|---|
| 2,424,086 | A | * 7/1947 | Bergsteinsson et al. | ....... 549/534 |
| 4,039,561 | A | 8/1977 | Mitsuhata et al. | |
| 4,207,210 | A | 6/1980 | Kilty | |
| 4,305,844 | A | 12/1981 | Vangermain et al. | |
| 4,353,741 | A | * 10/1982 | Capuano et al. | ............. 549/534 |
| 4,761,394 | A | 8/1988 | Lauritzen | |
| 4,766,105 | A | 8/1988 | Lauritzen | |
| 4,786,743 | A | 11/1988 | Bongaarts | |
| 4,994,588 | A | 2/1991 | Kapicak et al. | |
| 5,063,195 | A | * 11/1991 | Jin et al. | ......................... 502/341 |
| 5,077,256 | A | 12/1991 | Yamamoto et al. | |
| 5,102,848 | A | * 4/1992 | Soo et al. | ...................... 502/218 |
| 5,733,842 | A | 3/1998 | Gerdes et al. | |
| 2003/0171215 | A1 | * 9/2003 | Schmitz | ........................ 502/347 |
| 2007/0093669 | A1 | 4/2007 | Le-Khae et al. | |
| 2007/0173655 | A1 | 7/2007 | Grey | |
| 2009/0177000 | A1 | 7/2009 | Natal et al. | |

FOREIGN PATENT DOCUMENTS

| | | | |
|---|---|---|---|
| CN | 1511632 | A | 7/2004 |
| CN | WO2007085206 | * | 1/2007 |
| CN | 101007287 | A | 8/2007 |
| CN | 101850243 | A | 10/2010 |
| DE | 2933950 | | 3/1981 |
| EP | 0207550 | A1 | 1/1987 |
| JP | 2002-136868 | | 5/2002 |
| KR | 10-2008-0096678 | A | 10/2008 |

* cited by examiner

*Primary Examiner* — Melvin C Mayes
*Assistant Examiner* — Colette Nguyen
(74) *Attorney, Agent, or Firm* — Novick, Kim & Lee, PLLC; Allen Xue

(57) ABSTRACT

The present invention relates to a support for silver catalyst used in the ethylene oxide production, a preparation method for the same, a silver catalyst prepared from the same, and its use in the ethylene oxide production. The silver catalyst produced from the silver catalyst support has an improved activity, stability and/or selectivity in the production of ethylene oxide by epoxidation of ethylene.

25 Claims, No Drawings

SUPPORT FOR SILVER CATALYST IN ETHYLENE OXIDE PRODUCTION, METHODS FOR PREPARING THE SAME, SILVER CATALYST PREPARED THEREFROM, AND USE THEREOF

CROSS REFERENCE TO RELATED APPLICATIONS

This application claims priority under 35 U.S.C. §119 to Chinese Patent Application No. 201010281321.5, filed Sep. 13, 2010, which is hereby incorporated by reference in its entirety.

FIELD OF THE INVENTION

The present invention relates to an alumina support for silver catalyst used in the ethylene oxide production by gas-solid phase catalytic epoxidation of ethylene, a preparation method for the same, a silver catalyst prepared from the same, and its use in the ethylene oxide production.

BACKGROUND OF THE INVENTION

It is an important catalytic reaction process that ethylene reacts with oxygen over a metal silver catalyst to form ethylene oxide. The used silver catalyst can be a metal simple substance of silver itself, or a supported silver catalyst. Currently, most of the silver catalysts used in the industry are silver catalysts supported on alumina. For further improving the efficiency of the metal silver catalyst, enhancing the activity, the selectivity and the stability of the catalyst, and improving the economy of the production, many companies and research institutes have continuously made an exploration in the support, the promoter system, the preparation technology, the reaction condition and the like.

It is not economical to use the clumpy metal silver as catalyst in the industry. In addition, the clumpy metal silver has an inferior catalytic performance. Therefore, in many circumstances, the supported silver catalysts, into which other promoters are added, are used to improve the catalytic performance and the economy of the catalyst. Alkali metals and alkaline-earth metals are often used as promoters.

U.S. Pat. No. 4,039,561 disclosed a silver catalyst supported on alpha-alumina, which catalyst, besides silver, contains alkali metals K and Cs, Tl and at least one element selected from Group IVA metal elements, and has a selectivity of only about 78%.

U.S. Pat. No. 4,207,210 issued to Shell Oil Company in 1980 disclosed a silver catalyst supported on alpha-alumina, which catalyst contains one or more of alkali metals K, Rb and Cs, wherein the alkali metal promoter can be impregnated in advance or simultaneously together with silver. The obtained catalyst has a selectivity of up to about 80%.

U.S. Pat. No. 4,305,844 issued to Huels Chemische Werke AG in 1981) disclosed a silver catalyst containing 0.01-0.25% barium and alkali metal promoters, and having low initial activity and selectivity.

U.S. Pat. No. 4,761,394 issued to Shell Oil Company in 1988 disclosed a silver catalyst supported on a porous and heat-resistant support and containing alkali metals and rhenium aid. The catalyst was said to have an improved selectivity.

U.S. Pat. No. 4,766,105 issued to Shell Oil Company in 1988 further disclosed a silver catalyst supported on a porous and refractory support and containing alkali metal promoters, a rhenium promoter and a co-promoter of the rhenium promoter. The catalyst is said to have a further improved selectivity.

It is noticeable that while these catalysts containing rhenium have improved the initial selectivity, the activity and the stability are remarkably decreased.

The support is an important constituent of the supported catalyst. In the industrial silver catalyst, a support mainly composed of alpha-alumina is used for supporting silver. A suitable support should not only have a relative high mechanical strength, but also be capable of providing adequate specific surface area and pore structure. A prepared support can be surface-modified by treating the support to improve the dispersion of the catalytically active ingredient silver, alter the level of acid and base on the support surface, and adjust the surface electron state of metal silver and the adsorption and desorption properties of the reactants, so as to improve the catalytic performance of the silver catalyst. Some research works had been reported in these aspects.

Chinese Patent No. CN1044416 disclosed a silica surface-modified support obtained by coating 0.03-20 wt % of amorphous silica on the surface of the support pores by impregnation, drying and calcining at a high temperature of 700-1500° C. It is said that the catalyst obtained by depositing silver and promoters on the support and heat-treating at a temperature of 400-950° C. in an inert atmosphere has a higher selectivity, a higher activity and a longer lifetime.

U.S. Pat. No. 4,786,743 also disclosed a silver catalyst made from a support which is surface-treated by an acid of pKa≤3 and has a step-like structure. It is said that the catalyst has a relative good thermal stability, activity and selectivity. In this invention, an acid of pKa≤3, such as nitric acid, hydrochloric acid, sulfuric acid, phosphoric acid and oxalic acid is used to treat an alpha-alumina support. Then a formaldehyde solution is used to reduce silver to produce the silver catalyst. The selectivity is at most only about 80%.

DE 2933950 disclosed a catalyst for producing ethylene oxide from ethylene and oxygen. In said catalyst, alpha-alumina is used as the support material, and silver is used as active substance. Said catalyst is characterized in that the Si compound dissolvable in an alkali has a content of lower than 0.001 wt % calculated on $SiO_2$ in said catalyst. It is stated in this patent that a pure $\alpha$-$Al_2O_3$ should be used as the support material. If this pure $\alpha$-$Al_2O_3$ is not commercially available, a purification operation can be started from commonly commercially available $\alpha$-$Al_2O_3$, which is boiled with a substantially equivalent amount of a NaOH solution with a concentration of 1 wt % for 30 minutes, and washed with water free of salt until the solution has a pH of below 8. With this operation, $\alpha$-$Al_2O_3$ can be obtained, wherein the Si compound dissolvable in an alkali has a maximum content of lower than 0.001 wt % calculated on SiO2 in said catalyst. It is also stated in this patent that other methods can be used to decrease the content of the Si compound in the support to lower than 1 ppm. For example, the support can be boiled with a substantially equivalent amount of a hydrofluoric acid solution with a concentration of 1 wt % for 10 minutes, and then washed with water until the pH is greater than 5. It is said that the obtained silver catalyst containing the alkali metal promoter has a remarkably improved activity and lifetime (stability). The supported silver catalyst obtained with this patent has a maximum selectivity of only about 81.7% after two days. The treatment for the silver catalyst is complex.

JP 2002136868 disclosed an alumina support. A support starting material is shaped, and calcined at a temperature of 500-2000° C. to a support precursor which is mainly composed of alumina; the support precursor is treated with a hydrofluoric acid solution having a concentration of 0.1-15%, and calcined at a temperature of 1000-2000° C. for several hours to give the final support. It is said that a rhenium-containing silver catalyst made from this support has a good catalytic activity, selectivity, and lifetime. According to this patent, before shaping, to the support starting material is added alkali metal rather than alkaline-earth metal. In the examples of this patent, a hydrofluoric acid with high concentration such as about 5% or 4% is used to treat the support, and then a calcining treatment at a high temperature of 1000-2000° C. is required. Therefore, the preparation process has a high requirement on the equipment and a high production cost, and it is difficult for the large-scale practice.

Moreover, after the shaped pure α-alumina support is treated by the hydrofluoric acid solution, the mechanical strength remarkably decreases, which can cause the catalyst to break up and fragmentize, resulting in a tail burning in the ethylene epoxidation reactor and a safety problem in the silver catalyst application.

SUMMARY OF THE INVENTION

In view of the above-mentioned prior art circumstances, the present inventors have made deep researches in the field of the silver catalyst and its alumina support, and surprisingly found that a shaped and semi-finished α-alumina support containing alkaline-earth metal is impregnated with an acidic fluorine-containing solution and then heat-treated to produce the inventive α-alumina support. The catalyst obtained by loading the silver active component onto the so-prepared α-alumina support has shown an excellent catalytic activity (i.e., a lower reaction temperature), selectivity and stability (i.e., a long lifetime) during the process of producing ethylene oxide by epoxidation of ethylene.

Therefore, an object of the present invention is to provide a novel support for the silver catalyst used in the ethylene oxide production. The silver catalyst obtained from the support has shown an excellent catalytic activity, selectivity and stability during the process of producing ethylene oxide by oxidation of ethylene.

Another object of the present invention is to provide a process for preparing the above-mentioned support.

Another object of the present invention is to provide a silver catalyst prepared from the above-mentioned support.

Another object of the present invention is to provide a use of the above-mentioned silver catalyst in the production of ethylene oxide by oxidation of ethylene.

In one aspect, the present invention provides an alumina support, wherein the main crystal phase of its backbone is alpha-alumina; said support has a specific surface area of not higher than 3.0 m$^2$/g, preferably 0.5-2.0 m$^2$/g; a pore volume of 0.3-0.8 ml/g, preferably 0.4-0.7 ml/g; an alkaline-earth metal content of 0.05-1.8 wt %, preferably 0.1-1.0 wt % calculated on alkaline-earth metal based on the weight of the support; and a fluorine atom percent content on the support surface, measured by X-ray photoelectron spectroscopy (XPS), of 0.3-8.0% by atom, preferably 0.5-5.0% by atom.

In another aspect, the present invention provides a process for preparing an alumina support, which process comprises:
(a) mixing an alumina starting material, an alkaline-earth metal salt, a carbonaceous burnout material, a fluoride, a binder and water, wherein based on the total weight of the alumina starting material, the alkaline-earth metal salt is present in an amount of 0.05-2.0% by weight calculated on alkaline-earth metal, the carbonaceous burnout material is present in an amount of 0-30% by weight, the fluoride is present in an amount of 0-3% by weight, the binder and water are present in a total amount of 15-30% by weight;
(b) extruding the mixture obtained in step (a) into shape to give shaped bodies;
(c) drying the shaped bodies obtained in step (b) at a temperature between 60° C. and 200° C.;
(d) calcining the shaped bodies obtained in step (c) at a temperature between 1200° C. and 1600° C. to convert to an alpha-alumina, i.e., a semi-finished support;
(e) treating, preferably impregnating the semi-finished support obtained in step (d) with an acidic fluorine-containing solution having a fluorine content of 0.1-4.0 wt %, preferably 0.2-3.0 wt %, more preferably 0.3-2.0 wt % calculated on fluorine atom and a pH of less than 5; and
(f) further heat-treating the support treated in step (e).

In some embodiments, step (f) is conducted at a temperature between 200° C. and 950° C.

In some embodiments, in step (e), the acidic fluorine-containing solution is not an aqueous hydrofluoric acid solution.

In some embodiments, step (f) is conducted at a temperature between 200° C. and 950° C., and in step (e) the acidic fluorine-containing solution is not an aqueous hydrofluoric acid solution.

In some embodiments, the carbonaceous burnout material comprises petroleum coke, carbon powder, graphite, polyethylene, polypropylene, rosin, vaseline or a mixture thereof, preferably petroleum coke, graphite, vaseline or a mixture thereof.

In some embodiments, the alkaline-earth metal salt is a salt of barium, magnesium, calcium and/or strontium, preferably chloride, sulfate, nitrate, phosphate and/or oxalate thereof.

In a more preferable embodiment, the alkaline-earth metal salt is a heavy alkaline-earth metal salt, such as strontium and barium salt, in particular barium salt. In a particularly preferable embodiment, the alkaline-earth metal salt is barium sulfate.

In some embodiments, the fluoride comprises hydrogen fluoride, ammonium fluoride, aluminum fluoride, magnesium fluoride, cryolite or a mixture thereof, preferably the fluoride is aluminum fluoride and/or ammonium fluoride.

In some embodiments, the binder is nitric acid and/or acetic acid.

In some embodiments, the alumina starting material comprises trihydrate alpha-alumina and pseudo-boehmite, wherein the weight ratio of trihydrate alpha-alumina to pseudo-boehmite is 1:1-6:1, a portion or all of said trihydrate alpha-alumina can be replaced by either a substituting alumina powder which has been pre-calcined into alpha-alumina or a transition alumina; a portion or all of the pseudo-boehmite can be replaced by alumina sol; the ratio of the total weight of trihydrate alpha-alumina and its substitute if present to the total weight of pseudo-boehmite and its substitute if present is 1:1-6:1. In another preferable embodiment according to the present invention, the alumina starting material is trihydrate alpha-alumina and pseudo-boehmite, wherein the weight ratio of trihydrate alpha-alumina to pseudo-boehmite is 1:1-6:1.

In some embodiments, the support is washed with distilled water or deionized water for 1-5 times after step (e) and before step (f).

In some embodiments, step (f) is conducted at a temperature between 200° C. and 900° C.

In some embodiments, step (f) is conducted for 5-600 minutes.

In some embodiments, step (f) is conducted in a flowing atmosphere having a moisture content of less than 1 wt %, preferably air or an inert atmosphere.

In some embodiments, one or more organic fluorine-containing carboxylic acids containing 2-6 fluorine atoms such as trifluoroacetic acid and pentafluoropropionic acid, and/or a combination of a soluble fluoride such as ammonium fluoride and a decomposable or volatilizable acid such as oxalic acid is/are used as a solute of the acidic fluorine-containing solution.

In some embodiments, the acidic fluorine-containing solution is an aqueous acidic fluorine-containing solution.

In another aspect, the present invention provides a silver catalyst useful for producing ethylene oxide from ethylene by gas-phase catalytic oxidation, which contains: the alumina support according to the present invention, and silver deposited thereon in an amount of 1-45 wt % calculated on silver atom based on the total weight of the silver catalyst, optionally an alkali metal and/or alkaline-earth metal promoter and optionally a rhenium promoter.

In some embodiments, said alkali metal is one or more selected from a group consisting of Li, Na, K, Rb and Cs.

In some embodiments, the alkaline-earth metal is one or more selected from a group consisting of Mg, Ca, Sr and Ba.

In some embodiments, the silver catalyst contains the rhenium promoter.

In some embodiments, the silver catalyst contains: the alumina support according to the present invention, and silver deposited thereon in an amount of 1-45 wt % calculated on silver atom based on the total weight of the silver catalyst, the alkali metal promoter in an amount of 10-2000 ppm by weight calculated on the alkali metal atom, the rhenium promoter in an amount of 10-2000 ppm by weight calculated on the rhenium atom, the alkaline-earth metal promoter in an amount of 400-17000 ppm by weight calculated on the alkaline-earth metal atom, and optionally a co-promoter of the rhenium promoter.

In some embodiments, the silver catalyst further contains one or more promoters selected from cerium, sulfur, molybdenum, tungsten, chromium, and manganese.

In another aspect, the present invention provides a use of the silver catalyst in the production of ethylene oxide by oxidation of ethylene.

These aspects and other objects, features and advantages of the present invention will be more apparent upon reading the specification.

DETAILED DESCRIPTION

According to the present invention, the main crystal phase of the alumina support's backbone is alpha-alumina; said support has a specific surface area of not higher than 3.0 m$^2$/g, preferably 0.5-2.0 m$^2$/g; a pore volume of 0.3-0.8 ml/g, preferably 0.4-0.7 ml/g; an alkaline-earth metal (preferably Ba) content of 0.05-1.8 wt %, preferably 0.1-1.0 wt % calculated on alkaline-earth metal based on the weight of the support; and a fluorine atom percent content on the support surface, measured by X-ray photoelectron spectroscopy (XPS), of 0.3-8.0% by atom, preferably 0.5-5.0% by atom.

The alumina support of the present invention can be in a conventional form in the art, such as ring, sphere, column or multihole column, preferably seven-hole honeycomb-like cylindrical particle with an outer diameter of 3-9 mm and a small hole diameter of 1-2 mm, or single-hole circular ring-like particle with an outer diameter of 3-9 mm and an inner diameter of 2-5 mm.

In general, the process for preparing α-alumina support according to the present invention comprises: firstly preparing a semi-finished α-alumina support containing alkaline-earth metal, treated with an acidic fluorine-containing solution, and then heat-treated to obtain the finished α-alumina support.

Specifically, for preparing the semi-finished α-alumina support containing alkaline-earth metal, it is required to use trihydrate alpha-alumina or its substituent and pseudo-boehmite or its substituent as the alumina starting material.

For trihydrate alpha-alumina, the industrial trihydrate alpha-alumina can be used, for example, alumina trihydrate produced from the Bayer method can be used. Preferably, the Na and Si contents in the starting material trihydrate alpha-alumina are less than 0.2 wt % respectively.

For pseudo-boehmite, pseudo-boehmite having the Na and Si contents of less than 0.2 wt % respectively can be used.

For the preparation of the α-alumina support of the present invention, the weight ratio of trihydrate alpha-alumina and pseudo-boehmite is advantageously 1:1-6:1, preferably 1:1-4:1.

In the process of preparing the semi-finished α-alumina support, a portion or all of said trihydrate alpha-alumina can be replaced by either a substituting alumina powder which has been pre-calcined into alpha-alumina or a transition alumina; a portion or all of the pseudo-boehmite can be replaced by alumina sol; the ratio of the total weight of trihydrate alpha-alumina and its substitute if present to the total weight of pseudo-boehmite and its substitute if present is 1:1-6:1, preferably 1:1-4:1.

For preparing the semi-finished α-alumina support according to the present invention, an alkaline-earth metal salt should be used. That is to say, the semi-finished α-alumina support should contain the alkaline-earth metal. Due to the presence of the alkaline-earth metal, the strength of the semi-finished α-alumina support will not remarkably decrease upon the treatment of the acidic fluorine-containing solution and therefore it is guaranteed for the normal use of the silver catalyst obtained from said support.

For the alkaline-earth metal salt, any salt of barium, magnesium, calcium and/or strontium can be used, including organic and inorganic salts, for example, chloride, sulfate, nitrate, phosphate, oxalate and the like. Preferably the alkaline-earth metal salt is a heavy alkaline-earth metal salt, such as strontium and barium salt, in particular barium salt. In one particularly preferable embodiment, the alkaline-earth metal salt is barium sulfate.

The alkaline-earth metal salt is added in an amount of 0.05-2.0 wt %, preferably 0.1-1.0 wt % calculated on alkaline-earth metal atom based on the total weight of the alumina starting material.

In step (a) of the process for preparing the alumina support, the fluoride comprises hydrogen fluoride, ammonium fluoride, aluminum fluoride, magnesium fluoride, cryolite or a mixture thereof, preferably aluminum fluoride and/or ammonium fluoride.

The role of the fluoride is to accelerate the alumina crystalline form conversion and reduce the amounts of micropores having a size of 0.1 μm or less. The fluoride is added in an amount of 0-3 wt %, preferably 0.1-2 wt %, more preferably 0.3-1.8 wt %, particularly preferably 1.0-1.8 wt %, based on the total weight of the alumina starting material.

In step (a) of the process for preparing the alumina support, the carbonaceous burnout material is added so as to form large pores to provide the support with a suitable pore structure and a specific surface area. The carbonaceous burnout material comprises petroleum coke, carbon powder, graphite, polyethylene, polypropylene, rosin, vaseline or a mixture thereof, preferably petroleum coke, graphite, vaseline or a mixture thereof. The carbonaceous burnout material is oxidized during the calcining procedure with gases being formed and released so as to form large pores in the support. The carbonaceous burnout material is added in an amount of 0-30 wt %, preferably 0.01-20 wt %, more preferably 0.1-10 wt %, based on the total weight of the alumina starting material.

In step (a) of the process for preparing the alumina support, a binder can be added. The binder and pseudo-boehmite in the mixture form an alumina sol, which bind components together to form a shaped and extrudable paste. The binder comprises acids, such as nitric acid, formic acid, acetic acid, propionic acid and/or hydrochloric acid, preferably nitric acid and/or acetic acid. In case of using an acid as the binder, it is most preferable to use an aqueous nitric acid solution, wherein the weight ratio of nitric acid to water is 1:1.25-1:10, preferably 1:2-1:6. There is no particular limitation on the amount of the used binder provided that the binder is present in an amount sufficient to bind components together. In general, the binder is used in an amount of 2-10 wt %, preferably 3-8 wt %, based on the total weight of the alumina starting material. Alternatively, in general, the total weight of the binder and water is advantageously 15-30 wt %, preferably 20-30 wt %, based on the total weight of the alumina starting material; and the weight ratio of the binder to water is 1:0.5-1:14, preferably 1:1.5-1:9.

In step (a) of the process for preparing the alumina support, a portion or all of pseudo-boehmite can be replaced by alumina sol. In case of using alumina sol as the alumina starting material to replace all of pseudo-boehmite, in general, in step (a), there is no need to add the binder, and water is added in an amount of 15-30 wt %, preferably 20-30 wt %, based on the total weight of the alumina starting material.

In case of using alumina sol as the alumina starting material to replace a portion of pseudo-boehmite, a suitable amount of the binder is needed so as to bind components together.

After mixing components in step (a), in general, a paste will be obtained. Then the paste is extruded into shape to give an extrudate. This extrudate can be dried to a moisture content of 10 wt % or less. The drying temperature can be 60-200° C. The drying time can be controlled depending on the moisture content, for example, the drying time is 1-24 hours. The shape of the obtained extrudate can be in a form of ring, sphere, column or multihole column.

The dried extrudate is generally calcined at a temperature of 1200-1600° C., preferably 1200-1500° C. for 2-8 hours. Substantially all of the alumina, for example, more than 90% of the alumina can be converted to $\alpha$-$Al_2O_3$ by the calcining treatment so as to produce a semi-finished $\alpha$-alumina support, which has a specific surface area of 0.2-3.0 $m^2/g$, and an alkaline-earth metal content of 0.05-1.8 wt %, preferably 0.1-1.0 wt % calculated on alkaline-earth metal based on the weight of the support, and a pore volume of 0.3-0.8 ml/g.

In some embodiments, the specific surface area of the support is measured according to the International Standard ISO-9277 by the Nitrogen Gas Physical Adsorption BET Method. For example, the specific surface area of the support can be measured with Nitrogen Gas Physical Adsorption Instrument NOVA2000e (Quantachrome Corp., USA). The pore volume of the support is measured by the mercury porosimetry. For example, the pore volume of the support can be measured with AutoPore9510-type Mercury Porosimeter (Micromeritics Instrument Corp., USA). The content of the alkaline-earth metal in the support can be obtained by calculation or measurement (for example, X-Ray fluorescence). The radial crush strength of the support, for example, can be measured with the DL II type Particle Strength Tester (manufactured by Dalian Research and Design Institute of Chemical Industry) by randomly selecting thirty support sample particles, measuring the radial crush strength for each particle, and then calculating the average of the radial crush strength. The fluorine atom percent content on the support surface is obtained by the element sensitivity factor method based on the intensity of the spectra peak of the fluorine element F1s on the support surface measured by the X-ray photoelectron spectroscopy (XPS). For example, an XPS measurement can be conducted for the support, and the quantitative calculations for the sign peaks for Al2p, O1s, F1s, and C1s as well as the detectable alkaline-earth metal sign peaks (for example, Ba3d, Sr3d, Ca2p, and Mg1s) are done to obtain the fluorine atom percent content on the support surface. For the XPS measurement on the support, for example, Sigma Probe X-ray photoelectron spectrometer (VG Corp., U.K.) can be used in the following test conditions: monochromator Al target 400 μm[100 W], pass energy 50 eV, dwell time 50 ms, narrow-scan step length 0.1 eV, full-scan step length 1 eV, binding energy test.

After obtaining the semi-finished $\alpha$-alumina support, it is treated with the acidic fluorine-containing solution, i.e., step (e) of the process for preparing the alumina support. One or more organic fluorine-containing carboxylic acids containing 2-6 fluorine atoms, and/or a combination of a soluble fluoride such as ammonium fluoride and a decomposable or volatilizable acid such as oxalic acid, formic acid, acetic acid, hydrochloric acid, and nitric acid can be used as solute of the acidic fluorine-containing solution. The organic fluorine-containing carboxylic acid is preferably a mono-carboxylic acid, such as trifluoroacetic acid and pentafluoropropionic acid. For formulating the acidic fluorine-containing solution, water can be used as solvent. From the viewpoint of easy operation and safety consideration, the combination of a soluble fluoride such as solid ammonium fluoride and oxalic acid is preferably used to formulate the acidic fluorine-containing solution, for example, the molar ratio of oxalic acid to ammonium fluoride can be 1:1-1:6. The acidic fluorine-containing solution can be an aqueous hydrofluoric acid solution.

In some embodiments, the acidic fluorine-containing solution is not an aqueous hydrofluoric acid solution. In some embodiments, the acidic fluorine-containing solution is an aqueous acidic fluorine-containing solution formulated with a soluble fluoride and a decomposable or volatilizable acid, preferably the acidic fluorine-containing solution is an aqueous acidic fluorine-containing solution formulated with oxalic acid and ammonium fluoride in a molar ratio of oxalic acid to ammonium fluoride of 1:1-1:6. In some embodiments, the acidic fluorine-containing solution is an aqueous trifluoroacetic acid or pentafluoropropionic acid solution.

In step (e), the semi-finished $\alpha$-alumina support is treated with the acidic fluorine-containing solution. Preferably, based on the total weight of the semi-finished $\alpha$-alumina support, an excessive amount of the acidic fluorine-containing solution is used to treat the semi-finished $\alpha$-alumina support. More preferably, the weight ratio of the acidic fluorine-containing solution to the semi-finished $\alpha$-alumina support is at least 1.6, for example 1.6-3.

The used acidic fluorine-containing solution has a pH of less than 5, preferably less than 4. The acidic fluorine-containing solution has such a concentration that the fluorine content in the solution is 0.1-4.0 wt %, preferably 0.2-3.0 wt %, more preferably 0.3-2.0 wt % calculated on fluorine atom.

According to one embodiment of the present invention, the treatment of the semi-finished $\alpha$-alumina support with the acidic fluorine-containing solution means impregnating the semi-finished α-alumina support or the similar operation. The treatment time is usually 10-600 minutes. The treatment is usually conducted at room temperature (i.e., 10-30° C.).

In the process for preparing the alumina support, for the purpose of decreasing the content of the impurity such as Na and Si on the support surface, the support can be washed with distilled water or deionized water, preferably excessive distilled water for 1-5 times after step (e); and then the heat-treatment of step (f) is continued.

In step (f) of the process for preparing the alumina support, the support, which has been treated with the acidic fluorine-containing solution, is subjected to a heat-treatment. In this heat-treatment, the support is usually heated at a temperature of 200-950° C., preferably 200-900° C., more preferably 350-900° C. The heat-treatment comprises drying and calcining. The heat-treatment is usually conducted for 5-600 minutes. For example, the support, which has been treated with the acidic fluorine-containing solution, is dried and calcined at temperatures of 200-950° C. for 5-600 minutes. Step (f) is advantageously conducted in a flowing atmosphere, preferably in a flowing atmosphere having a moisture content of less than 1 wt %, preferably in air or in an inert atmosphere. Finally, the α-alumina support of the present invention is obtained.

Therefore, according to another aspect of the present invention, the present invention also provides an alpha-alumina support produced by the process for preparing the alumina support according to the present invention, wherein the main crystal phase of its backbone is alpha-alumina; said support has a specific surface area of not higher than $3.0 m^2/g$, preferably $0.5-2.0 m^2/g$; a pore volume of 0.3-0.8 ml/g, preferably 0.4-0.7 ml/g; an alkaline-earth metal content of 0.05-1.8 wt %, preferably 0.1-1.0 wt % calculated on alkaline-earth metal based on the weight of the support; and a fluorine atom percent content on the support surface, measured by X-ray photoelectron spectroscopy (XPS), of 0.3-8.0% by atom, preferably 0.5-5.0% by atom.

The alpha-alumina support produced by the process for preparing the alumina support according to the present invention can be in a conventional form in the art, such as ring, sphere, column or multihole column, preferably seven-hole honeycomb-like cylindrical particle with an outer diameter of 3-9 mm and a small hole diameter of 1-2 mm, or single-hole circular ring-like particle with an outer diameter of 3-9 mm and an inner diameter of 2-5 mm.

The silver catalyst of the present invention can be prepared from the above support. The silver catalyst of the present invention can be produced in a conventional manner, for example, by impregnating the above alumina support with a solution containing a silver compound and an organic amine.

The addition of the active component silver can be accomplished by a conventional impregnation method. For example, the support is impregnated in a silver-amine complex solution, and then heat-treated after removing a redundant solution by filtration. The used silver compound can be a silver precursor, such as silver oxide, silver nitrate, and silver oxalate, preferably silver oxalate. For ensuring the uniform and adequate loading of silver, the support is preferably vacuumed in advance, and immediately activated in a flowing air or inert gas such as nitrogen and argon at a temperature of 200-500° C. for 2 minutes or more after the impregnation and the filtration. For ensuring that the catalyst has a relative high activity, the heat-treatment should be conducted at a temperature not higher than 500° C. For further improving the catalyst performance, an alkali metal compound such as a lithium compound, a sodium compound, a potassium compound, a rubidium compound, a cesium compound or a mixture thereof, an alkaline-earth metal compound such as a calcium compound, a strontium compound, a barium compound or a mixture thereof, and a rhenium compound, as well as other promoters such as a co-promoter of the rhenium compound, can be added to the silver catalyst of the present invention. These catalyst promoters can be applied to the support before, during or after the silver impregnation, or impregnated onto the support after the silver compound has been reduced.

In some embodiments, the process for preparing the silver catalyst of the present invention comprises the following steps:

1) Impregnating the above alumina support with a sufficient amount of the solution of a silver compound, an organic amine, an optional alkali metal promoter, an optional alkaline-earth metal promoter, and an optional rhenium promoter and optionally its co-promoter;

2) Filtering the impregnation solution; and

3) Activating the support obtained in step (2) in the air or inert gas to produce the silver catalyst.

The above silver compound can be any silver compound suitable for preparing the silver catalyst useful for the production of ethylene oxide. According to the present invention, it is preferably to use silver oxide, silver nitrate and/or silver oxalate. The amount of the silver compound used in the impregnation procedure should be sufficient so that the finally produced silver catalyst contains 1-45 wt %, preferably 5-40 wt %, more preferably 8-35 wt % of silver calculated on the silver atom based on the total weight of the catalyst.

The above organic amine compound can be any organic amine compound suitable for preparing the silver catalyst useful for the production of ethylene oxide, provided that the organic amine compound has an ability to form a silver-amine complex with the silver compound. According to the present invention, it is preferably to use pyridine, butyl amine, ethylene diamine, 1,3-propylene diamine, ethanolamine or a mixture thereof, for example a mixture of ethylene diamine and ethanolamine.

In the process for preparing the silver catalyst of the present invention, the optionally alkali metal promoter can be a lithium compound, a sodium compound, a potassium compound, a rubidium compound or a cesium compound (such as nitrate, sulfate and hydroxide) or a mixture thereof, preferably the alkali metal promoter is one or more selected from the lithium compound, the potassium compound and the cesium compound, such as cesium nitrate, lithium nitrate and/or potassium hydroxide. In case of using the alkali metal promoter, it is favorably added to the impregnation solution in such an amount that the alkali metal is present in the final catalyst in an amount of 10-2000 ppm by weight, preferably 50-2000 ppm by weight, more preferably 50-1500 ppm by weight, calculated on the alkali metal atom.

In the process for preparing the silver catalyst of the present invention, the optionally used alkaline-earth metal promoter can be one or more of a magnesium compound, a calcium compound, a strontium compound and a barium compound, such as oxide, oxalate, sulfate, acetate and nitrate, preferably the barium compound and/or the strontium compound, such as barium acetate and/or strontium acetate. In case of using the alkaline-earth metal aid, it is favorably added to the impregnation solution in such an amount that the alkaline-earth metal is present in the final catalyst in an amount of 400-17000 ppm by weight, preferably 400-10000 ppm by weight, calculated on the alkaline-earth metal atom.

In the process for preparing the silver catalyst of the present invention, the optionally used rhenium promoter can be rhenium oxide, perrhenic acid, perrhenate, or a mixture thereof, preferably perrhenic acid and perrhenate, such as perrhenic acid, cesium perrhenate and ammonium perrhenate. The rhenium promoter is added to the impregnation solution in such an amount that the rhenium metal is present in the final catalyst in an amount of 0-2000 ppm, preferably 10-2000 ppm, more preferably 100-1000 ppm, calculated on the rhenium metal atom.

Besides the silver compound, the organic amine, the optional alkali metal promoter, the optional alkaline-earth metal promoter and the rhenium promoter, a co-promoter of the rhenium promoter can be added to further improve the activity, the selectivity and the stability of the obtained silver catalyst. The co-promoter of the rhenium promoter according to the present invention can be a compound of any transitional metal in the Periodic Table, or a mixture of transitional metal compounds, preferably an oxyacid of an element selected from Groups VIIB and VIIB, and a salt thereof, for example, tungstenic acid, ammonium tungstate, cesium tungstate, molybdic acid, ammonium molybdate, and ammonium metatungstate. The co-promoter of the rhenium promoter is used in such an amount that the co-promoter of the rhenium promoter is present in the final catalyst in an amount of 0-1000 ppm, preferably 0-800 ppm. The co-promoter of the rhenium promoter can be applied to the support before, during or after the silver impregnation, or impregnated onto the support after the silver compound has been reduced.

In some embodiments of the process for preparing the silver catalyst of the present invention, an aqueous solution of silver nitrate is firstly reacted with an aqueous solution of ammonium oxalate or oxalic acid to produce a precipitate of silver oxalate. The precipitate is filtered out, washed with deionized water until no nitrate ion is present, and dried. The silver oxalate is dissolved into an aqueous solution of organic amine such as pyridine, butyl amine, ethylene diamine, 1,3-propylene diamine, ethanolamine or a mixture thereof. Promoters are added to formulate an impregnation solution. Then the alumina support is impregnated with the obtained impregnation solution under a vacuum degree of not less than 700 mmHg for 10-60 minutes, filtered to dryness, and kept in air or an inert atmosphere at 200-500° C. for 2-120 minutes, preferably 2-60 minutes to activate. Alternatively, silver nitrate can be replaced with silver oxide; and silver oxalate can also be not subjected to the filtration, but directly form a complex with the organic amine, and then impregnate the support.

A silver catalyst can be obtained by the process for preparing the catalyst of the present invention, and it can be used in a gas-solid phase catalytic oxidation of ethylene to produce ethylene oxide.

Therefore, according to yet another aspect of the present invention, the present invention provides a silver catalyst prepared according to the above process and useful in a gas-phase catalytic oxidation of ethylene to produce ethylene oxide, which catalyst contains the alumina support prepared according to the present invention and silver deposited thereon in an amount of 1-45 wt % calculated on silver atom based on the total weight of the silver catalyst, optionally an alkali metal and/or alkaline-earth metal promoter and optionally a rhenium promoter.

In some embodiments, the silver catalyst obtained according to the present invention contains the alumina support prepared according to the present invention and silver deposited thereon in an amount of 1-45 wt % calculated on silver atom based on the total weight of the silver catalyst, an alkali metal promoter in an amount of 10-2000 ppm by weight calculated on the alkali metal atom, a rhenium promoter in an amount of 10-2000 ppm by weight calculated on the rhenium atom, an alkaline-earth metal promoter in an amount of 400-17000 ppm by weight calculated on the alkaline-earth metal atom, and optionally a co-promoter of the rhenium promoter.

Finally, the present invention also relates to a use of the silver catalyst according to the present invention in the production of ethylene oxide by oxidation of ethylene.

EXAMPLES

The present invention will be illustrated by the following examples, but the scope of the present invention is not limit thereto.

The Catalyst Performance Evaluation

The silver catalysts used in the examples of the present invention were tested in the laboratory micro-reactor for the catalytic reaction performance and the stability. In the micro-reactor testing apparatus, the reactor was a stainless steel reaction tube having an inner diameter of 4 mm. The reaction tube was disposed in a heating jacket. The loading volume of the catalyst was 1 ml (the particle size of the catalyst is 12-18 meshes). The inert filler was disposed in the lower portion so that the catalyst bed was located in the constant temperature area of the heating jacket.

The standard evaluation conditions for the catalytic activity and the selectivity used in the present invention are as follows (the actual reaction conditions are listed in the examples):

The composition of the reaction gas (mol %):

| | |
|---|---|
| Ethylene ($C_2H_4$) | 30.0 ± 2.5 |
| Oxygen ($O_2$) | 7.2 ± 0.5 |
| Carbon dioxide ($CO_2$) | <1.3 |
| Ballast gas($N_2$) | Balance |
| Inhibitor 1,2-dichloroethane | 0.5-2.0 ppmv |
| Reaction pressure | 1.8 MPa |
| Space velocity | 4500-7000 $h^{-1}$ |
| The concentration of ethylene oxide (EO) in the effluent from the reactor | 2.5 mol % |

Under a certain space velocity, when the reaction becomes stable and reaches the above reaction conditions, the compositions of the gases at the inlet and the outlet of the reactor are continually measured. The measurement results, after applying the volume-shrinkage correction thereto, are used to calculate the selectivity according to the following formula:

$$S = \frac{\Delta EO}{\Delta EO + 0.5 \times \Delta CO_2} \times 100\%$$

wherein $\Delta EO$ is the ethylene oxide concentration difference between the outlet and the inlet of the reactor; and $\Delta CO_2$ is the carbon dioxide concentration difference between the outlet and the inlet of the reactor. Ten or more sets of experiment data are taken and averaged as the experiment result of that day.

The Preparation for Support

Comparative Example 1

The Preparation for Comparative Support A 372.0 g industrial alpha-alumina trihydrate, 110.0 g pseudo-boehmite, 8.0 g ammonium fluoride, 1.0 g barium sulfate and 10.0 g vaseline were placed into a mixer to mix homogenously, then added 17 wt % dilute aqueous nitric acid solution 132.0 g, kneaded thoroughly to an extrudable paste, and extruded into shape to give shaped bodies. The shaped bodies were dried at about 80-100° C. for 16 h, heated up over 40 hours in a top-hat kiln to a temperature of 1300-1350° C., and kept at that temperature constantly for 6 hours to obtain the alpha-alumina Comparative Support A. The support had a shape of honeycomb-like seven-hole cylinder with an outer diameter of 8.3 mm and a height of 8.0 mm (said cylinder had seven parallel pore paths along the axial direction, wherein the centre pore diameter was 1.7 mm, and six small holes of 1.5 mm in diameter evenly distributed around the central pore), a barium content of 0.18 wt % based on the weight of the finished Comparative Support A, a specific surface area of 1.34 $m^2$/g, a pore volume of 0.53 ml/g, and a radial crush strength of 90 N/particle.

Example 2

The Preparation for Support B 62 g Comparative Support A obtained in Comparative Example 1 was placed into an acid-resistant plastic container, into which was added 125 g of an aqueous solution containing 1.2 wt % ammonium fluoride and 1.5 wt % oxalic acid (said solution had a pH of 3, the fluorine atom content was 0.62 wt %), soaked at room temperature for 40 minutes, filtered to remove the solution, then 90 g distilled water used to impregnate and wash the obtained sample for 20 minutes, filtered to remove water, the washing repeated twice in the same manner, dried in a flowing air stream at 450° C. for 10 minutes, calcined in a muffle furnace at a constant temperature of 500° C. for 120 minutes to give a support B. Analysis showed that Support B had a barium content of 0.17 wt % based on the weight of Support B, a specific surface area of 1.36 $m^2$/g, a pore volume of 0.53 ml/g, and a radial crush strength of 78 N/particle.

Example 3

The Preparation for Support C 62 g Comparative Support A obtained in Comparative Example 1 was placed into an acid-resistant plastic container, into which was added 125 g of an aqueous solution containing 1.2 wt % ammonium fluoride and 1.4 wt % oxalic acid (said solution had a pH of 3, the fluorine atom content was 0.62 wt %), soaked at room temperature for 40 minutes, filtered to remove the solution, then 90 g distilled water used to impregnate and wash the obtained sample for 20 minutes, filtered to remove water, the washing repeated twice in the same manner, dried in a flowing air stream at 450° C. for 10 minutes to give a support C. Analysis showed that Support C had a barium content of 0.17 wt % based on the weight of Support C, a specific surface area of 1.36 $m^2$/g, a pore volume of 0.53 ml/g, and a radial crush strength of 77 N/particle.

Comparative Example 4

The Preparation for Comparative Support D 337.4 g industrial alpha-alumina trihydrate, 144.6 g pseudo-boehmite, 7.0 g ammonium fluoride, 10.0 g vaseline and 5.0 g barium sulfate were placed into a mixer to mix homogenously, then added 17 wt % dilute aqueous nitric acid solution 142.0 g, kneaded thoroughly to an extrudable paste, and extruded into shape to give shaped bodies. The shaped bodies were dried at about 80-100° C. for 16 h, heated up over 42 hours in a high-temperature gas kiln to a temperature of 1300° C., and kept at that temperature constantly for 7 hours to obtain the alpha-alumina Comparative Support D, which had a shape of honeycomb-like seven-hole cylinder with an outer diameter of 8.3 mm and a height of 8.0 mm (said cylinder had seven parallel pore paths along the axial direction, wherein the centre pore diameter was 1.7 mm, and six small holes of 1.5 mm in diameter evenly distributed around the central pore). Comparative Support D had a barium content of 0.88 wt % based on the weight of the final Comparative Support D, a specific surface area of 1.34 $m^2$/g, a pore volume of 0.52 ml/g, and a radial crush strength of 148 N/particle.

Example 5

The Preparation for Support E 100 g Comparative Support D obtained in Comparative Example 4 was placed into an acid-resistant plastic container, into which was added 180 g of an aqueous solution containing 0.8 wt % ammonium fluoride and 1.4 wt % oxalic acid (said solution had a pH of about 2, the fluorine atom content was 0.41 wt %), soaked at room temperature for 60 minutes, filtered to remove the solution, then 120 g distilled water used to impregnate and wash the obtained sample for 20 minutes, filtered to remove the solution, dried in a flowing air stream at 500° C. for 10 minutes to give a support E. Analysis showed that Support E had a barium content of 0.87 wt % based on the weight of Support E, a specific surface area of 1.36 $m^2$/g, a pore volume of 0.52 ml/g, and a radial crush strength of 136 N/particle.

Comparative Example 6

The preparation for Comparative Support F 337 g industrial alpha-alumina trihydrate, 145 g pseudo-boehmite, 7.0 g ammonium fluoride and 10.0 g vaseline were placed into a mixer to mix homogenously, then added 17 wt % dilute aqueous nitric acid solution 138.0 g, kneaded thoroughly to an extrudable paste, and extruded into shape to give shaped bodies. The shaped bodies were dried at about 80-100° C. for 16 h, heated up over 40 hours in a high-temperature gas kiln to a temperature of 1300° C., and kept at that temperature constantly for 7 hours to obtain the alpha-alumina Comparative Support F, which had a shape of honeycomb-like seven-hole cylinder with an outer diameter of 8.3 mm and a height of 8.0 mm (said cylinder had seven parallel pore paths along the axial direction, wherein the centre pore diameter was 1.7 mm, and six small holes of 1.5 mm in diameter evenly distributed around the central pore). The Comparative Support F had a specific surface area of 1.10 $m^2$/g, a pore volume of 0.60 ml/g, and a radial crush strength of 98 N/particle.

Comparative Example 7

The Preparation for Support G 100 g Comparative Support F obtained in Comparative Example 6 was placed into an acid-resistant plastic container into which was added 180 g of an aqueous solution containing 0.8 wt % ammonium fluoride and 1.4 wt % oxalic acid (said solution had a pH of about 2, the fluorine atom content was 0.41 wt %), soaked at room temperature for 40 minutes, filtered to remove the solution, then 130 g distilled water used to impregnate and wash the obtained sample for 20 minutes, filtered to remove the solution, dried in a flowing air stream at 500° C. for 10 minutes to give a support G. Analysis showed that Support G had a specific surface area of 1.13 m²/g, a pore volume of 0.61 ml/g, and a radial crush strength of 66 N/particle. The results from Comparative Example 4 and Example 5 show that the radial crush strength of the α-alumina support containing the alkaline-earth metal will be reduced by a small extent (8.1%) after the treatment with the acidic fluorine-containing solution according to the present invention.

The results from Comparative Examples 6 and 7 show that the radial crush strength of the α-alumina support free of the alkaline-earth metal will be reduced remarkably (by 32.7%) after the treatment with the acidic fluorine-containing solution.

In Comparative Example 4 and Comparative Example 6, the substantially same reaction starting materials and conditions were used to prepare the supports, except that Comparative Example 6 did not use the alkaline-earth metal salt. The supports from Comparative Examples 4 and 6 have different physical properties. The specific surface area and the radial crush strength of the support from Comparative Example 4 are larger than those of the support from Comparative Example 6 respectively.

Example 5 and Comparative Example 7 were obtained respectively by treating the supports from Comparative Examples 4 and 6 with the acidic fluorine-containing solution. The decrease in the radial crush strength of the support containing the alkaline-earth metal salt (Example 5) is less than the decrease in the radial crush strength of the support free of the alkaline-earth metal salt (Comparative Example 7). Therefore, according to the present invention, the α-alumina support that has been treated with an acidic fluorine-containing solution can have a less decrease of the mechanical strength.

Comparative Example 8

The Preparation for Comparative Support H 390 g industrial alpha-alumina trihydrate, 115 g pseudo-boehmite, 8.5 g ammonium fluoride, 100.0 g petroleum coke (30-200 meshes) and 19.0 g magnesium nitrate hydrate were placed into a mixer to mix homogenously, then added 17 wt % dilute aqueous nitric acid solution 136.0 g, kneaded thoroughly to an extrudable paste, and extruded into shape to give shaped bodies. The shaped bodies were dried at about 80-100° C. for 16 h, heated up over 40 hours in a high-temperature gas kiln to a temperature of 1470° C., and kept at that temperature constantly for 7 hours to obtain the alpha-alumina Comparative Support H, which had a shape of honeycomb-like seven-hole cylinder with an outer diameter of 8.3 mm and a height of 8.0 mm (said cylinder had seven parallel pore paths along the axial direction, wherein the centre pore diameter was 1.7 mm, and six small holes of 1.5 mm in diameter evenly distributed around the central pore). Analysis showed that the Support H had a magnesium content of 0.52 wt %, a specific surface area of 1.0 m²/g, a pore volume of 0.61 ml/g, and a radial crush strength of 78 N/particle.

Example 9

The Preparation for Support I 100 g Comparative Support H obtained in Comparative Example 8 was placed into an acid-resistant plastic container, into which was added 200 g of an aqueous solution containing 3.2 wt % ammonium fluoride and 4.0 wt % oxalic acid (said solution had a pH of 3, the fluorine atom content was 1.64 wt %), soaked at room temperature for 40 minutes, filtered to remove the solution, dried in a flowing air stream at 450° C. for 10 minutes to give support I. Analysis showed that Support I had a magnesium content of 0.51 wt % based on the weight of Support I, a specific surface area of 1.01 m²/g, and a pore volume of 0.61 ml/g, and a radial crush strength of 69 N/particle.

Example 10

The Preparation for Support J

Support I obtained in Example 9 was further calcined in a high-temperature electric furnace at 940° C. for 8 h to give Support J. Analysis showed that Support J had a magnesium content of 0.51 wt % based on the weight of Support J, a specific surface area of 1.05 m²/g, a pore volume of 0.61 ml/g, and a radial crush strength of 68 N/particle.

Comparative Example 11

The Preparation for Comparative Support K 370.0 g alpha-alumina trihydrate, 110.0 g pseudo-boehmite, 7.5 g ammonium fluoride, 1.0 g barium sulfate, and 10.0 g vaseline were placed into a mixer to mix homogenously, then added 17 wt % dilute aqueous nitric acid solution 130.0 g, kneaded thoroughly to an extrudable paste, and extruded into shape to give shaped bodies. The shaped bodies were dried at about 80° C. for 12 h, heated up over 30 hours in a high-temperature gas kiln to a temperature of 1300° C., and kept at that temperature constantly for 7 hours to obtain the alpha-alumina Comparative Support K. Said support had a shape of honeycomb-like seven-hole cylinder with an outer diameter of 8.3 mm and a height of 8.0 mm (said cylinder had seven parallel pore paths along the axial direction, wherein the centre pore diameter was 1.7 mm, and six small holes of 1.5 mm in diameter evenly distributed around the central pore), a barium content of 0.18 wt % based on the weight of the finished Comparative Support K, a specific surface area of 1.40 m²/g, a pore volume of 0.51 ml/g, and a radial crush strength of 109 N/particle.

Example 12 and Comparative Example 13

The Preparation for Example Support L and Comparative Support M 100 g Comparative Support K was placed into an acid-resistant plastic container, into which was added 180 g of an aqueous solution containing 1.22 wt % ammonium fluoride and 1.52 wt % oxalic acid (said solution had a pH of about 3, the fluorine atom content was 0.63 wt %), soaked at room temperature for 40 minutes, filtered to remove the solution, then distilled water used to impregnate and wash the obtained sample for 10 minutes, filtered to remove water, the washing repeated once in the same manner, dried in a flowing air stream at 450° C. for 20 minutes to give the Example Support L, which had a barium content of 0.17 wt % based on the weight of the finished Support L, a specific surface area of 1.41 m²/g, a pore volume of 0.51 ml/g, and a radial crush strength of 101 N/particle.

A portion of Example Support L was further calcined at a constant temperature of 1450° C. for 240 minutes to give Comparative Support M.

Example 14

The Preparation for Support N 100 g Comparative Support K was placed into an acid-resistant plastic container, into which was added 180 g of an aqueous solution containing 0.70 wt % hydrofluoric acid (said solution had a pH of 3), soaked at room temperature for 40 minutes, filtered to remove the solution, then distilled water used to impregnate and wash the obtained sample for 10 minutes, filtered to remove water, the washing repeated once in the same manner, dried in a flowing air stream at 450° C. for 20 minutes to give the Example Support N, which had a barium content of 0.17 wt % based on the weight of the finished Example Support N, a specific surface area of 1.41 $m^2/g$, and a pore volume of 0.51 ml/g, and a radial crush strength of 99 N/particle.

The above supports were subjected to an X-ray photoelectron spectroscopy (XPS) test (Sigma Probe X-ray photoelectron spectrometer, VG Corp., U.K., test conditions: monochromator A1 target 400 μm[100 W], pass energy 50 eV, dwell time 50 ms, narrow-scan step length 0.1 eV, full-scan step length 1 eV, binding energy test). The fluorine contents on the support surfaces were quantitatively analyzed by measuring the intensity of the spectra peak of the element F1s and using the element sensitivity factor method. The results are shown in Table 1.

TABLE 1

Fluorine Content Analysis on Support Surface

| | Fluorine Content on Support Surface, % by atom |
|---|---|
| Comparative Support A | 0 |
| Support B | 1.6 |
| Support C | 1.8 |
| Comparative Support D | 0 |
| Support E | 3.0 |
| Comparative Support H | 0 |
| Support I | 7.8 |
| Support J | 0.6 |
| Comparative Support K | 0 |
| Support L | 3.8 |
| Comparative Support M | 0 |
| Support N | 3.6 |

The Catalyst Preparation and Evaluation

Group I

Comparative Silver Catalyst I 500 g silver nitrate was dissolved into 540 ml deionized water. 232 g ammonium oxalate was dissolved into 180 ml deionized water at 50° C. These two solutions were mixed under a violent stirring to form a white silver oxalate precipitate, aged for 60 minutes, and filtered. The precipitate was washed with deionized water until no nitrate group ion existed, and cold-dried to give a silver oxalate powder containing 62.6 wt % of silver and about 12% of water.

To a glass flask with a stirrer were added 35.4 g ethylene diamine, 13.0 g ethanolamine and 56.0 g deionized water to give a mixed solution. 76.6 g of the above powdery silver oxalate was slowly added to the mixed solution while stirring. The solution temperature was maintained at a temperature of 0-15° C., and silver oxalate was dissolved completely. Then 0.220 g cesium sulfate, 0.243 g strontium acetate, 0.116 g ammonium perrhenate, 0.0475 g lithium sulfate and deionized water were added so that the total weight of the solution reached 200 g. The obtained solution was mixed homogenously to give a silver-containing impregnation solution for use.

About 20 g of Comparative Support A was placed into a vessel which can be vacuumed, vacuumed to a pressure below 10 mmHg, fed an excess of the above silver-containing impregnation solution to immerge the support, maintained for 30 minutes, filtered to remove the redundant solution, then heated in an air stream at 280° C. for 5 minutes, and cooled to give the Comparative Silver Catalyst I, which was determined to have a silver content, based on the silver catalyst, of 17.2 wt %.

Inventive Silver Catalysts I-1 and I-2

Supports B and C, each 20 g, were placed respectively into vessels which can be vacuumed, vacuumed to below 10 mmHg, respectively fed an excess of the silver-containing impregnation solutions as described above for Comparative Silver Catalyst I to immerge the supports, maintained for 30 minutes, filtered to remove the redundant solutions, then heated in air streams at 280° C. for 5 minutes, and cooled to give the Inventive Silver Catalysts I-1 and I-2, which were determined respectively to have silver contents, based on the silver catalyst, of 17.3 wt % and 17.4 wt %.

Under the standard evaluation conditions given in the above section "The catalyst performance evaluation," Comparative Silver Catalyst I and Inventive Silver Catalysts I-1 and I-2 were evaluated and compared. The results are shown in Table 2.

TABLE 2

| | (Group I) | | | |
|---|---|---|---|---|
| Catalyst | Test Day (No.) | Space Velocity ($h^{-1}$) | Reaction Temperature (° C.) | Selectivity (%) |
| Inventive Silver Catalyst I-1 | 6 | 5000 | 223.3 | 84.1 |
| Inventive Silver Catalyst I-2 | 6 | 5000 | 227.2 | 84.0 |
| Comparative Silver Catalyst I | 6 | 5000 | 231.5 | 83.6 |
| Inventive Silver Catalyst I-1 | 12 | 5000 | 223.2 | 84.2 |
| Inventive Silver Catalyst I-2 | 12 | 5000 | 226.5 | 84.1 |
| Comparative Silver Catalyst I | 12 | 5000 | 235.0 | 84.0 |
| Inventive Silver Catalyst I-1 | 34 | 5000 | 226.0 | 84.5 |
| Inventive Silver Catalyst I-2 | 34 | 5000 | 229.3 | 84.2 |
| Inventive Silver Catalyst I-1 | 102 | 5000 | 225.8 | 84.6 |
| Inventive Silver Catalyst I-2 | 102 | 5000 | 231.8 | 84.7 |
| Inventive Silver Catalyst I-1 | 204 | 5000 | 229.2 | 84.9 |
| Inventive Silver Catalyst I-2 | 204 | 5000 | 233.0 | 85.3 |
| Inventive Silver Catalyst I-1 | 238 | 5000 | 231.8 | 84.8 |

TABLE 2-continued

(Group I)

| Catalyst | Test Day (No.) | Space Velocity (h⁻¹) | Reaction Temperature (° C.) | Selectivity (%) |
|---|---|---|---|---|
| Inventive Silver Catalyst I-2 | 238 | 5000 | 236.0 | 85.8 |

It is clear from Table 2 that in comparison with Comparative Silver Catalyst I, Inventive Silver Catalysts I-1 and I-2 have higher catalytic activities and comparable selectivities. In addition, the catalysts according to the present invention have shown excellent stabilities during the whole evaluation as long as 238 days. Therefore, the present catalyst has an excellent combined catalytic performance.

Group II

Comparative Silver Catalyst II

To a glass flask with a stirrer were added 38.6 g ethylene diamine, 13.5 g ethanolamine, and 56.0 g deionized water to give a mixed solution. 89.5 g silver oxalate obtained in the preparation of Comparative Silver Catalyst I was slowly added to the mixed solution while stirring. The solution temperature was maintained at a temperature of 0-15° C., and silver oxalate was dissolved completely. Then 0.220 g cesium sulfate, 0.243 g strontium acetate, 0.174 g ammonium perrhenate, 0.0475 g lithium sulfate and deionized water were added so that the total weight of the solution reached 200 g. The obtained solution was mixed homogenously to give a silver-containing impregnation solution for use.

About 20 g Comparative Support D was placed into a vessel which can be vacuumed, vacuumed to below 10 mmHg, fed an excess of the above silver-containing impregnation solution to immerge the support, maintained for 30 minutes, filtered to remove the redundant solution, then heated in an air stream at 280° C. for 5 minutes, and cooled to give the Comparative Silver Catalyst II, which was determined to have a silver content, based on the silver catalyst, of 19.5 wt %.

Inventive Silver Catalyst II

About 20 g Support E was placed into a vessel which can be vacuumed, vacuumed to below 10 mmHg, fed an excess of the silver-containing impregnation solution as described above for Comparative Silver Catalyst II to immerge the support, maintained for 30 minutes, filtered to remove the redundant solution, then heated in an air stream at 280° C. for 5 minutes, and cooled to give the Inventive Silver Catalyst II, which was determined to have a silver content, based on the silver catalyst, of 19.8 wt %.

Under the standard evaluation conditions given in the above section "The catalyst performance evaluation," Comparative Silver Catalyst II and Inventive Silver Catalyst II were evaluated and compared. The results are shown in Table 3.

TABLE 3

(Group II)

| Sample | Test Day (No.) | Space Velocity (h⁻¹) | Reaction Temperature (° C.) | Selectivity (%) |
|---|---|---|---|---|
| Inventive Silver Catalyst II | 6 | 4500 | 220.1 | 82.0 |
| Comparative Silver Catalyst II | 6 | 4500 | 222.0 | 81.2 |
| Inventive Silver Catalyst II | 14 | 4500 | 220.8 | 82.4 |
| Comparative Silver Catalyst II | 14 | 4500 | 224.7 | 82.3 |
| Inventive Silver Catalyst II | 38 | 4500 | 224.0 | 83.4 |
| Comparative Silver Catalyst II | 38 | 4500 | 228.1 | 83.4 |
| Inventive Silver Catalyst II | 113 | 4500 | 229.1 | 84.8 |
| Comparative Silver Catalyst II | 113 | 4500 | 233.2 | 84.1 |
| Inventive Silver Catalyst II | 189 | 4500 | 231.1 | 85.1 |
| Comparative Silver Catalyst II | 189 | 4500 | 235.3 | 84.2 |
| Inventive Silver Catalyst II | 283 | 4500 | 232.7 | 86.0 |
| Comparative Silver Catalyst II | 283 | 4500 | 237.5 | 85.0 |
| Inventive Silver Catalyst II | 377 | 4500 | 236.6 | 86.7 |

Group III

Comparative Silver Catalyst III

To a glass flask with a stirrer were added 35.6 g ethylene diamine, 13.0 g ethanolamine, and 61.0 g deionized water to give a mixed solution. 77.2 g of powdery silver oxalate obtained in the preparation of Comparative Silver Catalyst I was slowly added to the mixed solution while stirring. The solution temperature was maintained at a temperature of 0-15° C., and silver oxalate was dissolved completely. Then 0.230 g cesium sulfate, 0.25 g strontium acetate, 0.17 g ammonium perrhenate, 0.050 g lithium sulfate and deionized water were added so that the total weight of the solution reached 200 g. The obtained solution was mixed homogenously to give a silver-containing impregnation solution for use.

20 g Comparative Support H was placed into a vessel which can be vacuumed, vacuumed to a pressure below 10 mmHg, fed an excess of the above silver-containing impregnation solution to immerge the support, maintained for 30 minutes, filtered to remove the redundant solution, then heated in an air stream at 280° C. for 5 minutes, and cooled to give the Comparative Silver Catalyst III, which was determined to have a silver content, based on the silver catalyst, of 18.5 wt %.

Inventive Silver Catalysts III-1 and III-2

Supports I and J, each 20 g, were placed respectively into vessels which can be vacuumed, vacuumed to a pressure below 10 mmHg, respectively fed an excess of the silver-containing impregnation solutions as described above for Comparative Silver Catalyst III to immerge the supports, maintained for 30 minutes, filtered to remove the redundant solutions, then heated in air streams at 280° C. for 5 minutes, and cooled to give Inventive Silver Catalysts III-1 and III-2, which were determined respectively to have silver contents, based on the silver catalyst, of 18.7 wt % and 18.9 wt %.

Under the standard evaluation conditions given in the above section "The catalyst performance evaluation," Comparative Silver Catalyst III and Inventive Silver Catalysts III-1 and III-2 were evaluated and compared. The results are shown in Table 4.

TABLE 4

(Group III)

| Sample | Test Day (No.) | Space Velocity (h$^{-1}$) | Reaction Temperature (° C.) | Selectivity (%) |
|---|---|---|---|---|
| Inventive Silver Catalyst III-1 | 4 | 7000 | 242.2 | 85.2 |
| Inventive Silver Catalyst III-2 | 4 | 7000 | 239.0 | 84.5 |
| Comparative Silver Catalyst III | 4 | 7000 | 248.5 | 87.5 |
| Inventive Silver Catalyst III-1 | 14 | 4500 | 235.4 | 85.0 |
| Inventive Silver Catalyst III-2 | 14 | 4500 | 236.2 | 85.6 |
| Comparative Silver Catalyst III | 14 | 4500 | 243.0 | 88.4 |
| Inventive Silver Catalyst III-2 | 30 | 4500 | 240.0 | 86.2 |
| Comparative Silver Catalyst III | 30 | 4500 | 247.2 | 88.2 |
| Inventive Silver Catalyst III-2 | 120 | 4500 | 246.1 | 88.7 |
| Comparative Silver Catalyst III | 120 | 4500 | 256.3 | 87.6 |

Group IV

Comparative Silver Catalyst IV-1

To a glass flask with a stirrer were added 17.7 g ethylene diamine, 6.5 g ethanolamine and 30.0 g deionized water to give a mixed solution. 38.3 g silver oxalate obtained in the preparation of Comparative Silver Catalyst I was slowly added to the mixed solution while stirring. The solution temperature was maintained at a temperature of 0-15° C., and silver oxalate was dissolved completely. Then 0.126 g cesium sulfate, 0.085 g ammonium perrhenate, 0.058 g ammonium fluoride and deionized water were added so that the total weight of the solution reached 100 g. The obtained solution was mixed homogenously to give a silver-containing impregnation solution for use.

About 40 g Support K was placed into a vessel which can be vacuumed, vacuumed to a vacuum degree of above 700 mmHg, fed an excess of the above silver-containing impregnation solution to immerge the support, maintained for 30 minutes, filtered to remove the redundant solution, then heated in an air stream at 280° C. for 5 minutes, and cooled to give Comparative Silver Catalyst IV-1, which was determined to have a silver content, based on the silver catalyst, of 17.3 wt %.

Comparative Silver Catalyst IV-2 and Inventive Silver Catalyst IV

To a glass flask with a stirrer were added 17.7 g ethylene diamine, 6.5 g ethanolamine and 30.0 g deionized water to give a mixed solution. 38.3 g of silver oxalate obtained in the preparation of Comparative Silver Catalyst I was slowly added to the mixed solution while stirring. The solution temperature was maintained at a temperature of 0-15° C., and silver oxalate was dissolved completely. Then 0.13 g cesium sulfate, 0.085 g ammonium perrhenate and deionized water were added so that the total weight of the solution reached 100 g. The obtained solution was mixed homogenously to give a silver-containing impregnation solution for use.

Supports L and M, each 20 g, were placed respectively into vessels which can be vacuumed, vacuumed to a vacuum degree of above 700 mmHg, fed an excess of the above silver-containing impregnation solutions to immerge the supports, maintained for 30 minutes, filtered to remove the redundant solutions, then heated in air streams at 280° C. for 5 minutes, and cooled to give Inventive Silver Catalyst IV and Comparative Silver Catalyst IV-2, which were determined respectively to have silver contents, based on the silver catalyst, of 17.4 wt % and 17.2 wt %.

Under the standard evaluation conditions given in the above section "The catalyst performance evaluation", Comparative Silver Catalysts IV-1 and IV-2 and Inventive Silver Catalysts IV were evaluated and compared. The results are shown in Table 5.

TABLE 5

(Group IV)

| Catalyst | Test Day (No.) | Space Velocity (h$^{-1}$) | Reaction Temperature (° C.) | Selectivity (%) |
|---|---|---|---|---|
| Inventive Silver Catalyst IV | 4 | 5000 | 223.6 | 81.5 |
| Comparative Silver Catalyst IV-1 | 4 | 5000 | 227.0 | 80.6 |
| Comparative Silver Catalyst IV-2 | 4 | 5000 | 231.1 | 80.5 |
| Inventive Silver Catalyst IV | 14 | 5000 | 223.7 | 82.1 |
| Comparative Silver Catalyst IV-1 | 14 | 5000 | 229.6 | 80.6 |
| Comparative Silver Catalyst IV-2 | 14 | 5000 | 234.2 | 80.3 |

It is clear from the above Table 5 that the present catalyst, Inventive Silver Catalyst IV, has a higher catalytic activity and selectivity than those of Comparative Silver Catalysts IV-1 and IV-2.

Group V

Comparative Silver Catalyst V and Inventive Silver Catalysts V-1 and V-2

To a glass flask with a stirrer were added 35.6 g ethylene diamine, 13.0 g ethanolamine and 61.0 g deionized water to give a mixed solution. 77.2 g of silver oxalate obtained in the preparation of Comparative Silver Catalyst I was slowly added to the mixed solution while stirring. The solution temperature was maintained at a temperature of 0-15° C., and silver oxalate was dissolved completely. Then 0.280 g caesium nitrate, 0.18 g ammonium perrhenate and deionized water were added so that the total weight of the solution reached 200 g. The obtained solution was mixed homogenously to give a silver-containing impregnation solution for use.

20 g Support K was placed into a vessel which can be vacuumed, vacuumed to a vacuum degree of above 700 mmHg, fed an excess of the above silver-containing impregnation solution to immerge the support, maintained for 30 minutes, filtered to remove the redundant solution, then heated in an air stream at 280° C. for 5 minutes, and cooled to give Comparative Silver Catalyst V, which was determined to have a silver content, based on the silver catalyst, of 18.8 wt %.

Supports L and N, each 20 g, were placed respectively into vessels which can be vacuumed, vacuumed to a vacuum degree of above 700 mmHg, fed an excess of the above silver-containing impregnation solutions to immerge the supports, maintained for 30 minutes, filtered to remove the redundant solutions, then heated in air streams at 280° C. for 5 minutes, and cooled to give Inventive Silver Catalysts V-1 and V-2, which were determined respectively to have silver contents, based on the silver catalyst, of 18.6 wt % and 18.6 wt %.

Under the standard evaluation conditions given in the above section "The catalyst performance evaluation," Comparative Silver Catalyst V and Inventive Silver Catalysts V-1 and V-2 were evaluated and compared. The results are shown in Table 6.

TABLE 6

| | (Group V) | | | |
|---|---|---|---|---|
| Catalyst | Test Day (No.) | Space Velocity ($h^{-1}$) | Reaction Temperature (° C.) | Selectivity (%) |
| Inventive Silver Catalysts V-1 | 4 | 5000 | 211.2 | 82.8 |
| Inventive Silver Catalysts V-2 | 4 | 5000 | 211.3 | 82.7 |
| Comparative Silver Catalyst V | 4 | 5000 | 213.2 | 82.3 |
| Inventive Silver Catalysts V-1 | 10 | 5000 | 211.6 | 83.1 |
| Inventive Silver Catalysts V-2 | 10 | 5000 | 211.8 | 82.9 |
| Comparative Silver Catalyst V | 10 | 5000 | 213.6 | 82.3 |

It is clear from the above Table 6 that the present catalysts, Inventive Silver Catalysts V-1 and V-2, have higher catalytic activities and selectivities than those of Comparative Silver Catalyst V.

What is claimed is:

1. An alumina support comprising:
a backbone having a main crystal phase that comprises alpha-alumina, wherein said alumina support comprises:
a specific surface area of 3.0 m²/g or smaller;
a pore volume between 0.3 ml/g and 0.8 ml/g;
an alkaline-earth metal content between 0.05 wt % and 1.8 wt % of the weight of the alumina support, calculated based on the weight of elemental alkaline-earth metal; and
a fluorine content on the surface of the alumina support between 0.3 at. % and 8.0 at. %.

2. The alumina support of claim 1, wherein the specific surface area is between 0.5 m²/g and 2.0 m²/g.

3. The alumina support of claim 1, wherein the pore volume is between 0.4 ml/g and 0.7 ml/g.

4. The alumina support of claim 1, wherein the alkaline-earth metal is Barium (Ba).

5. The alumina support of claim 1, wherein the alkaline-earth metal content is between 0.1 wt % and 1.0 wt %.

6. The alumina support of claim 1, wherein the fluorine content is between 0.5 at. % and 5 at. %.

7. A process for preparing an alumina support, comprising:
(a) mixing an alumina starting material, an alkaline-earth metal salt, optionally a carbonaceous burnout material, optionally a fluoride, a binder and water to form a mixture;
(b) extruding the mixture obtained in step (a) to obtain an extrudate;
(c) drying the extrudate of step (b) at a temperature between 60° C. and 200° C.;
(d) calcining the extrudate of step (c) at a temperature between 1,200° C. and 1,600° C. to obtain a semi-finished support; and
(e) treating the semi-finished support of step (d) with an acidic fluorine-containing solution having a fluorine content of 0.1-4.0 wt % calculated based on elemental fluorine and a pH of less than 5.

8. The process according to claim 7, further comprising (f) heat-treating the support obtained in step (e) at a temperature between 200° C. and 950° C.

9. The process according to claim 8, wherein the heat-treatment in step (f) is conducted at a temperature between 200° C. and 900° C. for 5-600 minutes.

10. The process according to claim 7, wherein the carbonaceous burnout material is chosen from petroleum coke, carbon powder, graphite, polyethylene, polypropylene, rosin, Vaseline, or a mixture thereof;
the alkaline-earth metal salt is chosen from salts of barium, magnesium, calcium, and strontium; and
the fluoride is chosen from hydrogen fluoride, ammonium fluoride, aluminum fluoride, magnesium fluoride, cryolite, and a mixture thereof; and
the binder is an acid.

11. The process according to claim 7, wherein the alumina starting material is chosen from trihydrate alpha-alumina, alpha-alumina, transition alumina, pseudo-boehmite, alumina sol, and mixtures thereof.

12. The process of claim 11, wherein the weight ratio of a sum of trihydrate alpha-alumina, alpha-alumina, and transition alumina to a sum of pseudo-boehmite and alumina sol ranges from 1:1 to 6:1.

13. The process according to claim 7, wherein the acidic fluorine-containing solution has a fluorine content of 0.2-3.0 wt % calculated based on elemental fluorine.

14. The process according to claim 7, wherein in step (a) the alkaline-earth metal salt is 0.05-2.0% by weight of the alumina starting material, the carbonaceous burnout material is 0-30% by weight of the alumina starting material, the fluoride is 0-3% by weight of the alumina starting material.

15. The process according to claim 7, wherein the acidic fluorine-containing solution comprises one or more organic fluorine-containing carboxylic acid having 2-6 fluorine atoms.

16. The process according to claim 7, wherein the organic fluorine-containing carboxylic acid is trifluoroacetic acid or pentafluoropropionic acid.

17. The process according to claim 7, wherein the acidic fluorine-containing solution is obtained by dissolving a fluoride salt in a decomposable or volatilizable acid.

18. The process according to claim 7, wherein the alkaline-earth metal salt is chosen from chlorides, sulfates, nitrates, phosphates, or oxalates of barium, magnesium, calcium, and strontium.

19. The process of claim 7, wherein the acidic fluorine-containing solution has a fluorine content of 0.3-2.0 wt % calculated based on elemental fluorine.

20. A silver catalyst useful for producing ethylene oxide from ethylene by gas-phase catalytic oxidation, comprising:
an alumina support as defined in claim 1; and silver deposited thereon in an amount of 1-45 wt % calculated on silver atom based on the total weight of the silver catalyst.

21. The silver catalyst according to claim 20, further comprising:
a promoter selected from the group consisting of an alkali metal compound, an alkaline-earth metal compound, and a rhenium compound.

22. The silver catalyst according to claim 21, further comprising a rhenium compound co-promoter.

23. The silver catalyst according to claim 20, further comprising:
one or more promoters selected from the group consisting of a cerium compound, a sulfur compound, a molybdenum compound, a tungsten compound, a chromium compound, and a manganese compound.

24. The silver catalyst according to claim 21, wherein an alkali metal compound promoter is selected from the group consisting of a Li compound, a Na compound, a K compound, a Rb compound and a Cs compound, and an alkaline-earth metal promoter is selected from the group consisting of a Mg compound, a Ca compound, a Sr compound, and a Ba compound.

25. The silver catalyst according to claim 21, wherein the alkali metal compound promoter is in an amount of 10-2000 ppm by weight calculated on the alkali metal atom; the rhenium promoter compound is in an amount of 10-2000 ppm by weight calculated on the rhenium atom; and the alkaline-earth metal promoter is in an amount of 400-17000 ppm by weight calculated on the alkaline-earth metal atom, and optionally a co-promoter of a rhenium promoter.

* * * * *